May 19, 1942.  R. E. SCHENSTED  2,283,466

PROCESS FOR STEREOSCOPIC MOTION PICTURES IN COLORS

Filed April 8, 1940  2 Sheets-Sheet 1

Ray C. Schensted, INVENTOR.
BY Bush & Bush,
ATTORNEYS.

May 19, 1942.   R. E. SCHENSTED   2,283,466
PROCESS FOR STEREOSCOPIC MOTION PICTURES IN COLORS
Filed April 8, 1940     2 Sheets-Sheet 2

Roy E. Schensted, INVENTOR.
BY Bush & Bush, ATTORNEYS.

Patented May 19, 1942

2,283,466

UNITED STATES PATENT OFFICE 2,283,466

PROCESS FOR STEREOSCOPIC MOTION PICTURES IN COLORS

Roy E. Schensted, Clarion, Iowa

Application April 8, 1940, Serial No. 328,454

9 Claims. (Cl. 88—16.4)

My invention relates to a new and useful method or process for reproducing upon a silver screen fractional stereoscopic pictures through color screens and polarizing screens of opposite angles, in such time relation as to produce to the observer the visual effect of complete stereoscopic pictures in natural colors, or in approximately natural colors, when viewed by the observer through polarizing screens corresponding to the polarizing screens of the projector, and to the method or process of photographing scenes upon a black and white sensitized film through color screens corresponding to those of the projector in such time relation as to permit the reproduction thereof as described.

One form of apparatus adapted to carry out this process, is shown in the drawings, in which Figure 1 is a front elevation of a projector showing opaque segment 30 and color screens, orange 31, green 32, blue 33 and red 34, and showing the color screens broken away in part to disclose the position of polarizers 17a and 18a.

Figure 2 shows a side elevation of the projector with one side of the casing removed to disclose the lens tubes 17 and 18 with polarizers 17a and 18a, and the picture film 65 positioned in the rear of the lens; also disclosing as No. 68 the source of light which supplies the light to the lens tubes.

Figure 3 shows a camera with lenses spaced apart to produce the stereoscopic effect and shows the housing 99, opaque segments 30b, polarizers 17b and 18b and color screens 31, 32, 33 and 34 of orange, green, blue and red respectively.

Figure 4 is a diagrammatic view of a film with transverse pairs of pictures numbered from 100 up for convenience of description.

Figure 2:
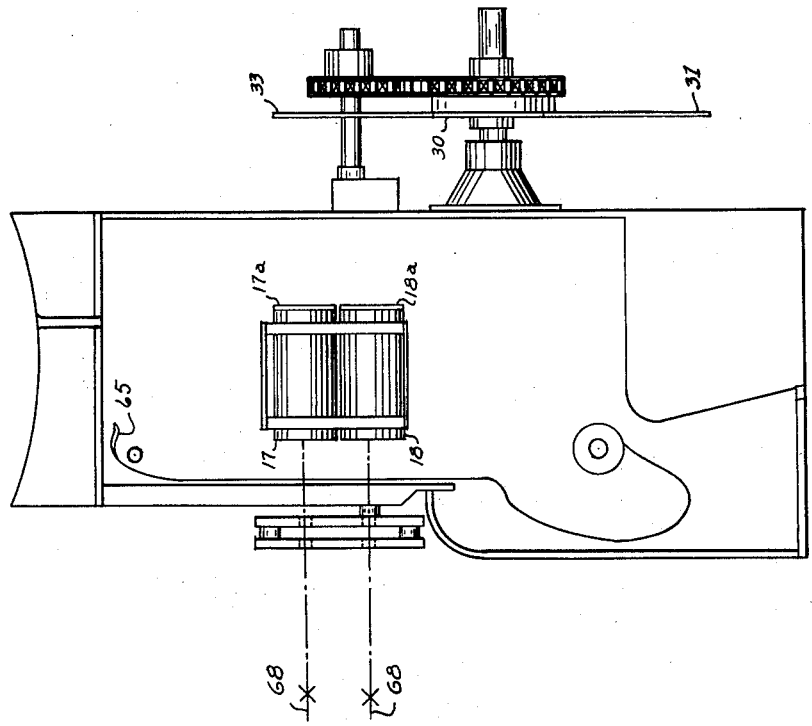
Figure 2 is a diagrammatic side elevation of the camera shown in Figure 1 with the nearest side plate removed to disclose the relative position of the lenses and the film carrier and the position of the rotatable screen.

In order to distinguish the receiving screen from the color and polarizing screens of the camera and the projector, I use the term "silver screen" to indicate any kind of a curtain, plate, mirror or screen capable of receiving the rays from a projector and reproducing thereon the images projected.

I use the term "polarizing screens of opposite polarity," to indicate polarizing screens one of which will polarize the light in lines or waves traveling at right angles to the lines or waves of the other polarizing screen or to indicate circular polarizing screens of clockwise and counterclockwise polarity, and I use the term "color screens," to indicate a colored, transparent plate, film or similar device colored in such a way as to lend its colors to the rays of light passing therethrough or to cut off rays of light having other colors.

I use the term "opposite" as applied to colors to indicate a color from the warm side of the spectrum as opposed to a color from the cool side of the spectrum.

I use the term "fractional" to indicate pictures or images showing only the portions of a scene which would register upon a black and white color-corrected film or photographic plate when a transparent color screen of uniform color is utilized, in connection with the lenses of a camera, to intercept the rays of light entering the camera to be focused thereby; also to indicate a corresponding color screen interposed between the lenses of a projector and a silver screen utilized in connection therewith.

My process may be carried out in part by the projector described in my co-pending application dated March 21, 1940, Serial No. 327,164, and by a camera fitted up with polarizing and color screens shown in the accompanying drawings, but I do not limit my process to the use of the particular apparatus shown and described, but have shown same merely as constituting one form of apparatus by which my method or process may be utilized and put into effect.

My process involves the taking and projection of the fractional pictures in stereoscopic pairs consisting of a right and a left picture, the right picture being taken by one camera or one lens of a camera, and the left picture being taken from another camera or another lens of the same camera spaced apart either vertically or horizontally or at any other angle, but preferably horizontally.

I prefer to take the pictures of each pair simultaneously and also to project the pictures of each pair simultaneously. Likewise the right picture of a given pair is taken through a color screen carrying one color of the spectrum and the left picture of the same pair is taken through a color screen bearing a color from a different portion of the spectrum. In using these colors I prefer to select colors from the cool section of the spectrum, such as blue or green, for one picture of each pair and a color from the opposite or warm section of the spectrum, such as red or orange, for the other pictures of the same pair.

Likewise two successive colors, such as red and yellow, may be utilized to get the orange effect for one picture of a stereoscopic pair, and two colors such as blue and yellow may be utilized in succession to produce the effect of green in the other picture of such pair.

Considerable variation may be made in the arrangement and selection of the colors utilized for the screens for any given pair.

In general, I prefer to use color screens bearing four different colors so that when a blue screen is utilized for the right picture, a red or orange color will be utilized for the simultaneous left picture, and when a green color screen is used for the left picture, a red or orange screen will be utilized for the right picture.

Figure 1:
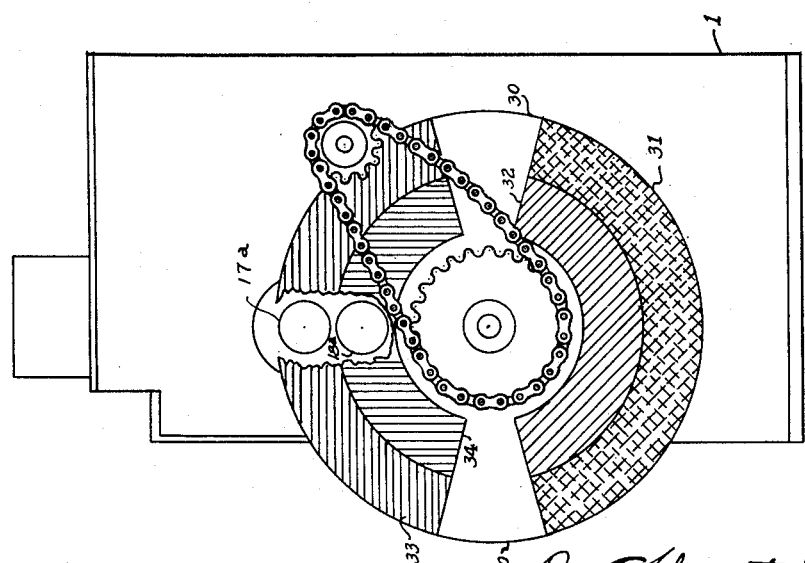
Figure 1 shows a front view of a motion picture camera with a rotatable four-color combined screen and shutter mounted in front of the lenses, a portion of the color screen being broken away to show the lenses.
Figure 3:
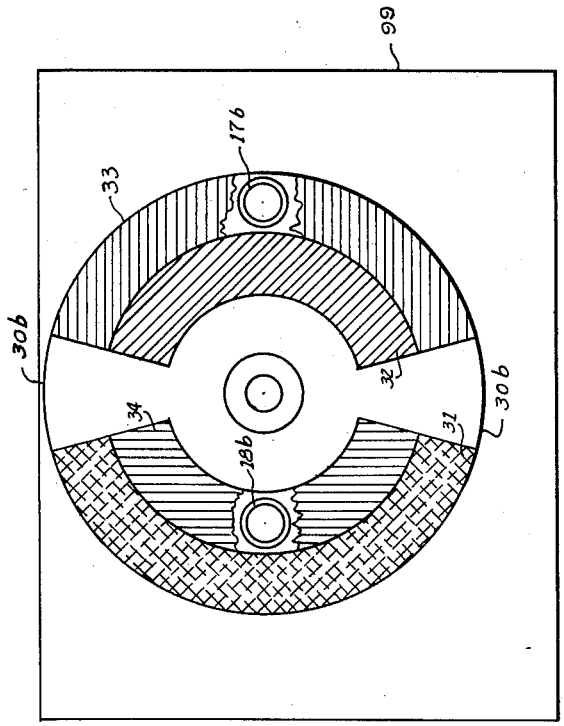
Figure 3 shows a front view of a camera with the lenses spaced apart for stereoscopic pictures and portions of the color screen being broken away to disclose the lenses.

These color screens may be formed in sections on a single rotatable carrier, as shown in the drawings in Figures 1 and 2 which show a projector with color screen attached carrying four different colors, blue, red, green and orange, arranged in inner and outer bands in segments with shutters intervening; and Figure 3 which shows a camera with a similar rotatable color screen.

The spaced apart lenses of the camera or projector may be so arranged that the outer band of colors will be interposed in the course of the rays for the right pictures and the inner band of colors interposed in the line of the rays of the left pictures, or vice versa, but if desired, separate screens may be used for each lens and the screens synchronized so as to produce the same successive interposition of the various color screens as that just described.

Figure 4:
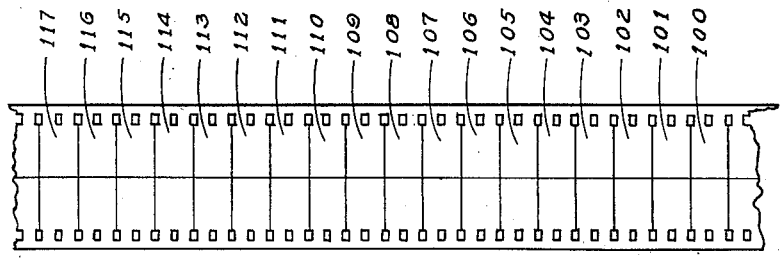
Figure 4 shows a portion of a film containing two sets or bands of picture frames separated at the middle, the right pictures being numbered with even numbers and the left pictures numbered with odd numbers as hereafter described. (See page 4 of the specifications.)

When the pictures are taken in a single band upon a given film, they are preferably spaced longitudinally as shown in Figure 4, in which I have shown the right pictures numbered with even numbers and the left pictures as numbered with odd numbers.

Thus, frame or picture No. 100 would be a right picture taken and projected through a blue color screen simultaneously with left picture No. 105 taken and projected through a red color screen. Right picture No. 102 would be taken through an orange color screen and projected through an orange color screen simultaneously with left picture No. 107 projected through a green color screen. Right picture No. 104 would be taken and projected through a blue color screen simultaneously with left picture No. 109 taken and projected through a red color screen, and so on in regular progression throughout the entire length of the film.

The camera shown in Figure 3 would be fitted with a similar rotatable color screen with the colors arranged in similar sections, but separate screens can be used for each lens if desired with the successive colors arranged in the same way as the inner or outer bands of colors on the rotatable screen shown in Figure 1.

When the pictures are spaced upon the film as indicated, any of the ordinary forms of feed mechanism may be utilized in connection with the shutters in common use, and in projecting, flicker screens may be utilized if desired, but I do not limit my process to the use of any particular form of shutter or flicker screen, as various forms are in common use and well known.

In projecting the pictures, polarizing screens are mounted in line to intercept the rays coming from the projector, preferably just in front of the lenses. The polarizing screens need not be plane polarizers, but any appropriate form of polarizers may be used upon either lens with an opposite polarizer on the other lens.

The observer is furnished with a pair of polarizing spectacles or screens, the right one of which corresponds to the polarity of the polarizing screen over the right lens, and the left member of the pair corresponds to the polarizing screen of the left lens of the projector.

In carrying out my process, the fractional pictures are first photographed upon the film in the way described, with such modification of order as may be desired, and through the color screens as described, with such modifications as may be desired.

The films are then developed in black and white. Positives are printed for projection in the order herein described. The picture films for exhibition are then run through the projector in the order indicated and projected to the silver screen.

The observer in the audience is provided with a pair of polarizing spectacles as described and when he views the pictures upon the silver screen through those spectacles, his right eye will observe the fraction of the picture shown through the right lens and simultaneously his left eye will observe the fraction of the picture shown through the left lens. The visual effect thus produced will be that of a stereoscopic picture showing the fractions taken through the color screens through which such pair of pictures is projected. The next stereoscopic pair of pictures will be projected in such rapid succession that the visual effect produced upon the observer will be that of a complete picture shown in its natural colors.

The timing of the exposures and the operation of the shutters may be in accordance with the practice common in the motion picture industry and may vary within the limits of acceptable vision. In taking the photographs I prefer to utilize the simultaneous exposure of each pair for about one-forty-eighth of a second and to have the interruption of the shutters occupy about one-forty-eighth of a second.

In projection I prefer to limit the time of the shutter while the film is moving to one-ninety-sixth of a second and the interruption of the flicker blade to one-ninety-sixth of a second, giving two periods of one-ninety-sixth of a second each for the projection of each pair of pictures. Thus the color screen carrying two bands of colors would make a complete revolution in one-twelfth of a second. For slow motion pictures, the time in taking would be varied as necessary.

Two or more successive colors may be used in the same segment of one of the color screens to produce the effect of a mixture of those colors, and the exposure of each of such colors may be a corresponding fraction of the time which would otherwise be devoted to the exposure of the single color alone.

From the above description it will be seen that each time the color screen as shown in Figure 3 makes a complete rotation, two pairs of fractional pictures will be taken, one pair comprising a right picture taken through a blue screen and a left picture taken through a red screen, and the other pair comprising a right picture taken through an orange color screen and a left picture taken through a green color screen.

Likewise, with each revolution of the color screen shown in Figure 1, two pairs of pictures will be projected, one pair comprising a right picture projected through a blue screen and a left picture projected through a red screen and the next pair comprising a right picture taken through an orange screen and a left picture taken through a green screen, but the timing of the exposures will be such that the four fractions comprising such two pairs will produce the visual effect of one complete picture in stereoscopic projection and approximately in its full natural colors.

In the motion picture apparatus heretofore in use where two or more pictures have been projected simultaneously to the viewing screen and superimposed thereon, there has been difficulty in securing an exact registration of the two pictures without which blurring would occur; and, in stereoscopic pictures, parallax has tended to increase the blurring. Likewise, in the various color picture systems, inexact registration has tended to produce color fringing and blurring where two pictures were projected simultaneously. I overcome these difficulties by the use of polarizers so that while the two eyes see simultaneously, they see different pictures and different colors and in this way the accommodative power of the eyes overcomes the inexact registration of the pictures and produces the natural effect of more exact registration, both in position and color. Furthermore, the eyes, by separating the colors in this way, add to the impression of depth or third dimension produced by the spacing of the lenses during the taking of the pictures.

Another new feature of my method is that I alternate the colors for the right eye so that it sees in alternation a denser and a lighter color, and the same is true of the left eye. Thus a warm right picture is followed by a cool right picture, and a cool left picture is followed by a warm left picture, etc. At the same time, while a warm color picture is viewed by one eye, a cool color picture is viewed by the other eye, and vice versa. This arrangement tends to balance the light received by the eyes and to relieve the eye strain ensuing from unbalanced continuous exposure of one eye to a bright light and the other to a continuous exposure to a reduced light. It also makes it unnecessary to vary either the width of the color screens or the length of time of exposure to the differently colored screens in projecting the pictures.

While I have shown in the drawing a four-color screen with red, green, blue and orange colors (Fig. 1), that is intended to be illustrative of colors from warm and cool sections of the spectrum and not to limit my description and claims to those or any other precise colors.

I am aware that polarizers and analyzers have been used in connection with stereoscopic pictures, and that color screens and color films have been used either separately or together in various arrangements, and also that many difficulties have been pointed out by various inventors in their respective applications for patents heretofore issued, but, so far as I am aware, no prior inventor has used the particular means described by me to accomplish the results sought to be accomplished by my invention, nor has anyone attempted to present to the right and left eyes of the spectator, respectively, the right and left fractional pictures necessary to make a complete group, using the term "group" to indicate an assemblage of the fractions necessary to form a complete stereoscopic picture of a given view in such a way that the warm and cool colors will act in succession upon each eye of the observer and so that the warm and cool colors acting upon one eye will act simultaneously with the action of the cool and warm colors upon the other eye, whereby the light intensities acting upon each eye will vary with the colors presented thereto in proportion to their respective densities, and will alternate in accordance with the alternation of the colors.

My method includes the combination of all the elements set out above and by my arrangement the eye strain arising from the continuous presentation of a brighter or more intense light to one eye accompanying the continuous presentation of a less intense light to the other eye, will be avoided or greatly relieved. Likewise, a much better impression of the natural colors of the objects photographed will be made upon the eyes, and color fringing and color blurring avoided or greatly reduced, thus producing the last or final step essential to satisfactory motion picture projection in colors.

In this process there is no overlapping of exposures. The pairs are taken in timed succession, but the two pictures of any given pair are taken simultaneously, projected simultaneously, and observed simultaneously. As various modifications may be made in the color, form, succession, and timing of the pictures both in photographing and projecting, as well as in the form and character of the polarizers, without departing from the spirit of my invention, I do not limit my claims to the precise description set out. Thus, instead of rotatable color screens, reciprocating color screens may be utilized. Likewise, various forms of polarizers may be employed.

I claim:

1. The method of taking fractional stereoscopic pictures upon color-corrected black and white films which consists in taking said fractional pictures in successive pairs, one picture of each pair being taken through a color screen bearing one of the cool colors of the spectrum, and the other picture of said pair being simultaneously taken through a color screen bearing a warm color of the spectrum, every pair of pictures being taken through screens bearing different colors from the preceding and succeeding pairs, but such preceding and succeeding pairs both being taken through the same or similar screens, the picture of each pair bearing a warm color of the spectrum being followed by a picture bearing a color from the cool section of the spectrum whereby, when the pairs of pictures are projected to a screen in the sequence in which they were originally taken, through a pair of opposite polarizers and viewed through a corresponding pair of polarizers, each warm picture seen by a given eye of the observer will be followed by a cool picture observed by the same eye, and at the same time that either eye is seeing a warm picture, the other eye will be seeing a cool picture, thereby relieving the eyes from the strain incident to the continued viewing of successive warm and therefore bright pictures, as well as permitting the natural accommodation of the eyes to overcome the fringing of the different colors.

2. The method as described in claim 1, each pair of fractional pictures comprising a right picture and a left picture of the same scene from different angles.

3. The method as described in claim 1, each pair of fractional pictures comprising a right picture and a left picture, the pictures of each pair being spaced apart upon the film with a given uniform number of frames intervening between them.

4. The method of taking fractional pictures upon color-corrected black and white films which consists in taking said fractional pictures in successive pairs, one picture of each pair being taken through a color screen bearing one of the cool colors of the spectrum, and the other picture of said pair being taken through a color screen bearing a warm color of the spectrum, every pair of pictures being taken through screens bearing different colors from the preceding and succeeding pairs, but such preceding and succeeding pairs both being taken through the same or similar screens, the picture of each pair bearing a warm color of the spectrum being followed by a picture bearing a color from the cool section of the spectrum whereby, when the pairs of pictures are projected to a screen in the sequence in which they were originally taken, through a pair of opposite polarizers and viewed through a corresponding pair of polarizers, each warm picture seen by a given eye of the observer will be followed by a cool picture observed by the same eye, and at the same time that either eye is seeing a warm picture, the other eye will be seeing a cool picture, thereby relieving the eyes from the strain incident to the continued viewing of successive warm and therefore bright pictures, as well as permitting the natural accommodation of the eyes to overcome the fringing of the different colors.

5. The method of successively displaying in timed relation fractional stereoscopic pictures taken upon color-corrected black and white films as described in claim 1 which consists in projecting to a silver screen said fractional pictures in successive pairs, one picture of each pair being projected through a color screen bearing one of the cool colors of the spectrum, and the other picture of said pair being simultaneously projected through a color screen bearing a warm color of the spectrum, every pair of pictures being projected through screen bearing different colors from the preceding and succeeding pairs, but such preceding and succeeding pairs both being projected through the same or similar screens and each picture bearing a color from the warm section of the spectrum being projected through a color screen having a corresponding warm color and being followed by a picture bearing a color from the cool section of the spectrum projected through a screen of corresponding color whereby, when the pairs of pictures are projected to a screen in the sequence in which they were originally taken, through a pair of opposite polarizers and viewed through a corresponding pair of polarizers, each warm picture seen by a given eye of the observer will be followed by a cool picture observed by the same eye, and at the same time that either eye is seeing a warm picture, the other eye will be seeing a cool picture, thereby relieving the eyes from the strain incident to the continued viewing of successive warm and therefore bright pictures, as well as permitting the natural accommodation of the eyes to overcome the fringing of the different colors.

6. The method of producing upon a silver screen the visual effect of three-dimensional pictures in natural colors which comprises taking fractional pictures in successive pairs of the scene desired to be reproduced, one picture of each pair being taken through a color screen bearing one of the cool colors of the spectrum, and the other picture of said pair being simultaneously taken through a color screen bearing a warm color of the spectrum, every pair of pictures being taken through screens bearing different colors from the preceding and succeeding pairs, but such preceding and succeeding pairs both being taken through the same screens, and projecting said fractional pictures in successive pairs to the silver screen, one picture of each pair being projected through a color screen bearing one of the cool colors of the spectrum, and the other picture of said pair being projected through a color screen bearing a warm color of the spectrum, every pair of pictures being projected through screens bearing different colors from the preceding and succeeding pairs, but such preceding and succeeding pairs both being projected through the same or similar screens, each of said pairs of fractional pictures consisting of a right picture and a left picture of the same scene from different angles, and interposing in the paths of the rays of light from the projector, polarizing screens, the polarizing angle of the screen for the left picture being at right angles to the polarizing angle of the screen of the right picture, and viewing said pictures upon the screen through polarizing lenses or screens for the right and left eyes respectively corresponding to the polarizing screens used in projecting the right and left pictures.

7. The method of exhibiting motion pictures in color which consists in taking fractional stereoscopic pictures upon color-corrected black and white films in successive pairs, one picture of each pair being taken through a color screen bearing one of the cool colors of the spectrum, and the other picture of said pair being taken through a color screen bearing a warm color of the spectrum, every pair of pictures being taken through screens bearing different colors from the preceding and succeeding pairs, but such preceding and succeeding pairs both being taken through the same screens the picture of each pair bearing a warm color of the spectrum being followed by a picture bearing a color from the cool section of the spectrum, then projecting simultaneously and in timed succession the pairs of right and left images through color screens or filters of the same color as those with which they were taken, upon a silver screen by means of separate polarized light beams of opposite polarity, and then viewing the reflected images from said screen through polarized light filters corresponding to the polarization of said light beams, whereby the beam of light projecting the left image will be viewed by the left eye, and the beam projecting the right image will be viewed by the right eye.

8. The method as described in claim 5, each pair of fractional pictures comprising a right picture and a left picture, and the right and left pictures respectively being projected through polarizing screens of opposite polarity.

9. The method of producing upon a silver screen the visual effect of three-dimensional pictures in natural colors which comprises taking fractional pictures in successive pairs of the scene desired to be reproduced, one picture of each pair being taken through a color screen bearing one of the cool colors of the spectrum, and the other picture of said pair being simultaneously taken through a color screen bearing a warm color of the spectrum, every pair of pictures being taken through screens bearing different colors from the preceding and succeeding pairs, but such preceding and succeeding pairs both being taken through the same screens, and projecting said fractional pictures in successive pairs to the silver screen, one picture of each pair being projected through a color screen bearing one of the cool colors of the spectrum, and the other picture of said pair being projected through a color screen bearing a warm color of the spectrum the picture of each pair bearing a warm color of the spectrum being followed by a picture bearing a color from the cool section of the spectrum, every pair of pictures being projected through screens bearing different colors from the preceding and succeeding pairs, but such preceding and succeeding pairs both being projected through the same or similar screens, each of said pairs of fractional pictures consisting of a right picture and a left picture of the same scene from different angles, and interposing in the paths of the rays of light from the projector, polarizing screens of opposite polarity for the right and left pictures respectively, and viewing said pictures upon the screen through polarizing lenses or screens for the right and left eyes respectively corresponding to the polarizing screens used for the right and left pictures.

ROY E. SCHENSTED.